(12) United States Patent
Staab et al.

(10) Patent No.: US 11,082,630 B2
(45) Date of Patent: Aug. 3, 2021

(54) VEHICULAR VISION SYSTEM USING ADAPTIVE MASK AT CAMERA

(71) Applicant: Magna Electronics Inc., Auburn Hills, MI (US)

(72) Inventors: Johannes Staab, Hösbach (DE); Martin Solar, Erlenbach (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/817,712

(22) Filed: Mar. 13, 2020

(65) Prior Publication Data

US 2020/0296273 A1    Sep. 17, 2020

Related U.S. Application Data

(60) Provisional application No. 62/817,642, filed on Mar. 13, 2019.

(51) Int. Cl.
*H04N 5/238* (2006.01)
*B60R 11/04* (2006.01)

(52) U.S. Cl.
CPC .............. *H04N 5/238* (2013.01); *B60R 11/04* (2013.01)

(58) Field of Classification Search
CPC ...... H04N 5/2254; H04N 5/238; H04N 5/217; B60R 11/04
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |
| 6,824,281 B2 | 11/2004 | Schofield et al. |
| 6,995,891 B2 | 2/2006 | Agrawal et al. |
| 7,038,577 B2 | 5/2006 | Pawlicki et al. |
| 7,480,149 B2 | 1/2009 | DeWard et al. |
| 7,720,580 B2 | 5/2010 | Higgins-Luthman |
| 7,855,755 B2 | 12/2010 | Weller et al. |
| 8,256,821 B2 | 9/2012 | Lawlor et al. |
| 9,487,159 B2 | 11/2016 | Achenbach |
| 9,596,387 B2 | 3/2017 | Achenbach et al. |
| 9,871,971 B2 | 1/2018 | Wang et al. |
| 9,896,039 B2 | 2/2018 | Achenbach et al. |
| 10,227,046 B2 | 3/2019 | Habibi |
| 2009/0295181 A1 | 12/2009 | Lawlor et al. |

(Continued)

*Primary Examiner* — Obafemi O Sosasnya
(74) *Attorney, Agent, or Firm* — Honigman LLP (57) ABSTRACT

A vehicular vision system includes an optical device disposed at a vehicle and having a field of view exterior of the vehicle, with the camera having an imager that senses light incident thereat. An adaptive masking element is disposed in an optical path of the camera. Responsive to processing, via an image processor of a control, of image data captured by the camera, the control determines presence of a bright or intense light source in the field of view of the camera. The adaptive masking element, responsive to determination of a location where light emanating from the bright light source impinges the adaptive masking element, generates a light attenuating mask at that location to attenuate the light emanating from that bright light source so that the imager does not fully sense the light emanating from that bright light source.

18 Claims, 6 Drawing Sheets

(56) References Cited

U.S. PATENT DOCUMENTS

| | | | |
|---|---|---|---|
| 2011/0204209 A1* | 8/2011 | Barrows | H01L 27/14643 |
| | | | 250/208.1 |
| 2011/0273659 A1 | 11/2011 | Sobecki | |
| 2014/0160284 A1 | 6/2014 | Achenbach et al. | |
| 2014/0226012 A1 | 8/2014 | Achenbach | |
| 2015/0015713 A1 | 1/2015 | Wang et al. | |
| 2015/0219809 A1* | 8/2015 | Ruhnau | H04N 5/335 |
| | | | 348/360 |
| 2015/0327398 A1 | 11/2015 | Achenbach et al. | |
| 2017/0177000 A1* | 6/2017 | Meyhofer | H04N 5/2257 |

* cited by examiner

VEHICULAR VISION SYSTEM USING ADAPTIVE MASK AT CAMERA

CROSS REFERENCE TO RELATED APPLICATION

The present application claims the filing benefits of U.S. provisional application Ser. No. 62/817,642, filed Mar. 13, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 9,896,039; 9,871,971; 9,596,387; 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) or other suitable optical sensing device to capture image data representative of images exterior of the vehicle, and provides an adaptive mask or light attenuating element in the field of view of the camera, with the adaptive mask adaptively masking a portion of the field of view where a bright light source (e.g., a rising or setting sun) is present in the field of view of the camera. By selectively or adaptively masking only areas where bright light sources are present, the camera and system provide enhanced imaging and enhanced object detection via processing of image data captured by the camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver/driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a forward direction. The vision system includes an image processor or image processing system that is operable to receive image data from one or more cameras and to process the received image with different image processing algorithms and technologies. Optionally, the vision system may provide display of video images derived from image data captured by one or more vehicle cameras, such as a rearview display or a top down or bird's eye or surround view display or the like.

Figure 1:
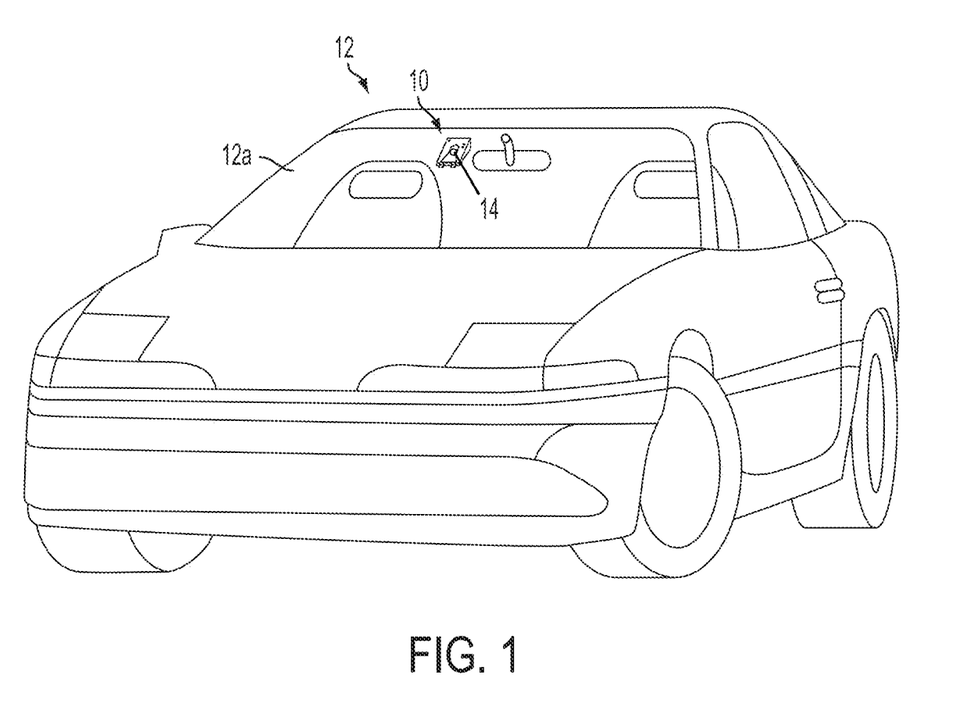
FIG. 1 is a plan view of a vehicle with a vision system that incorporates at least one camera in accordance with the present invention.

Referring now to the drawings and the illustrative embodiments depicted therein, a vision system or driving assist system 10 for a vehicle 12 includes at least one exterior viewing imaging sensor or camera or optical sensing device, such as a forward viewing imaging sensor or camera 14, which may be disposed at and behind the windshield 12a of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) comprising electronic circuitry and associated software, with the electronic circuitry comprising an image processor that is operable to process image data captured by the camera or cameras. The ECU, via processing by the image processor of image data captured by the camera, may detect objects or the like and/or may provide displayed images at a display device for viewing by the driver of the vehicle. The data transfer or signal communication from the camera to the ECU may comprise any suitable data or communication link, such as a vehicle network bus or the like of the equipped vehicle.

The system 10 includes an adaptive masking element or adaptive light attenuating element, such as a liquid crystal element or the like, that is operable to generate a dark or non-light transmitting (or partially light transmitting) or light absorbing mask at a particular area to attenuate light incident at that area of the masking element. The system thus applies an adaptive black masking element at the optical device (such as a camera or laser-scanner or time-of-flight sensor or the like) to limit or avoid the negative impact of extreme bright light sources present in the field of view or sensing of the optical device. The system thus provides improved accuracy, availability and functionality of the sensor, and enhances the signal processing performance and image quality of image data captured by the sensor or device.

Figure 2:
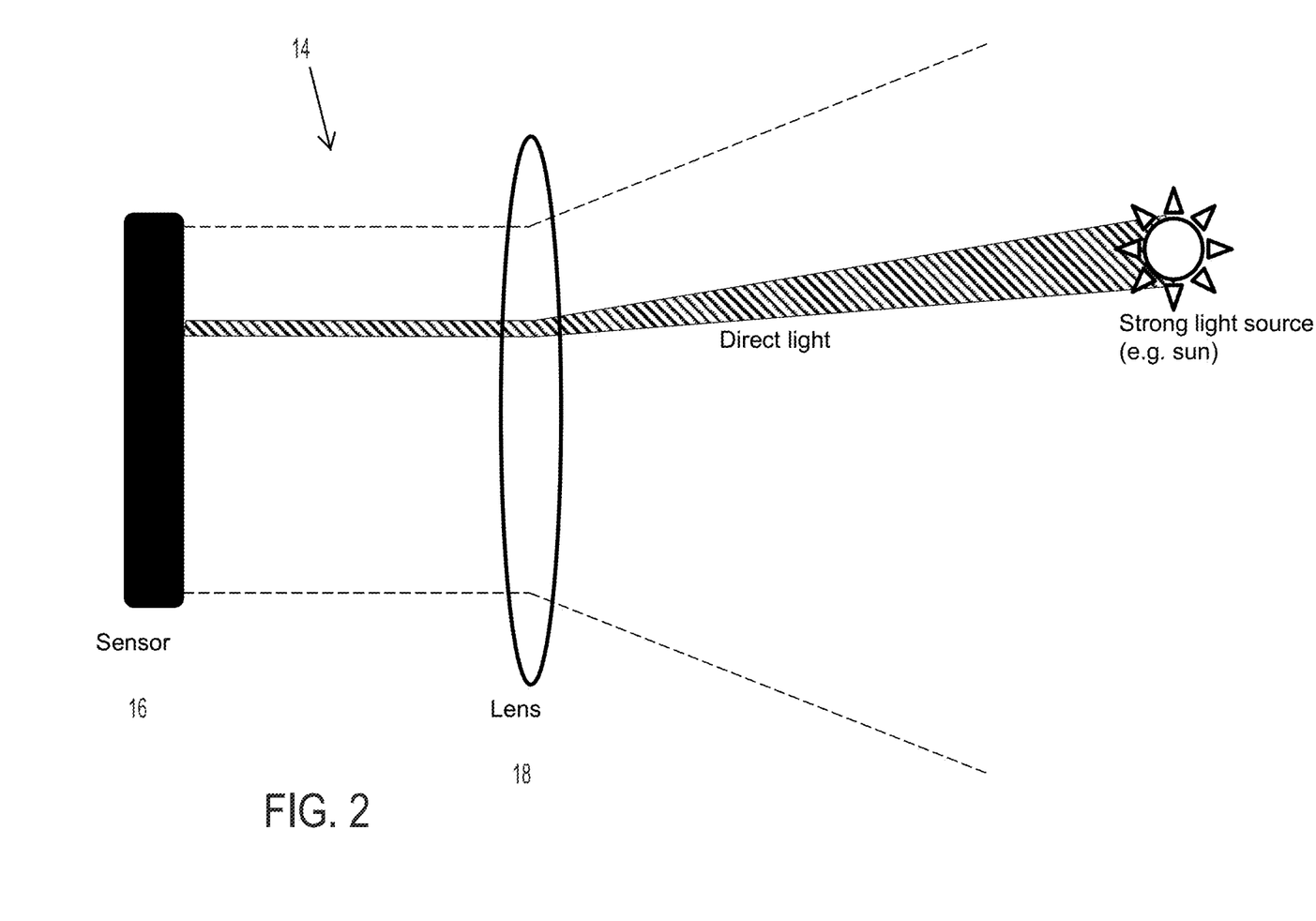
FIG. 2 is a schematic showing the forward viewing camera receiving direct light from a bright light source in the field of view of the camera.
Figure 3:
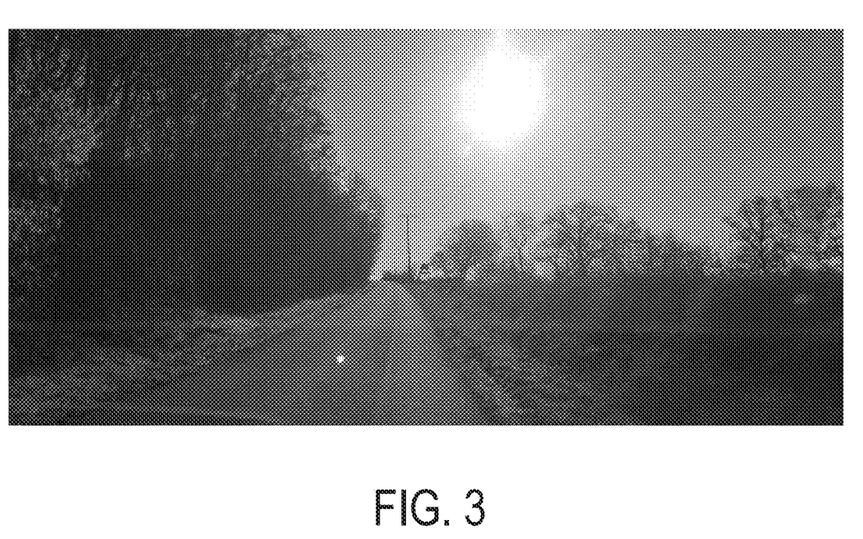
FIGS. 3 and 4 are images captured by a forward viewing camera of the vehicle with no masking in the field of view of the camera.
Figure 4:
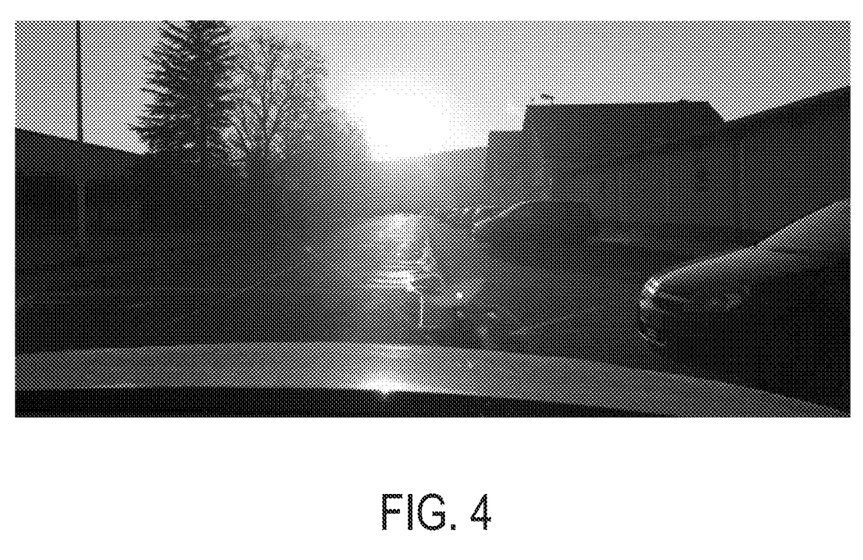

As shown in FIG. 2, the camera 14 includes an imager or imaging array sensor 16 (comprising a plurality of rows and columns of photosensing elements) and a lens 18. Light from a scene viewed by the camera is focused at the imager by the lens. When a strong or intense or bright light source (e.g., the sun when rising or setting ahead of the vehicle and/or in the field of view of the sensor, and/or an oncoming vehicle with high beams turned on) is present in the field of view or sensing of the sensor, the direct bright light is imaged by the imager. As shown in FIGS. 3 and 4, such intense light in the sensor's field of view leads to glare and light reflections, causing reduced visibility and reflections. Such an intense light source impacts the rest of the image being captured, as the sensor's parameters (e.g., exposure time, white balance, etc.) can be adjusted in response to the bright light source to avoid complete washout of the images, but such adjustments may not fully accommodate or correct the effects of the bright light source. This strong amount of oncoming light might also result in reflections and flares on the image sensor's pixel level.

Figure 5:
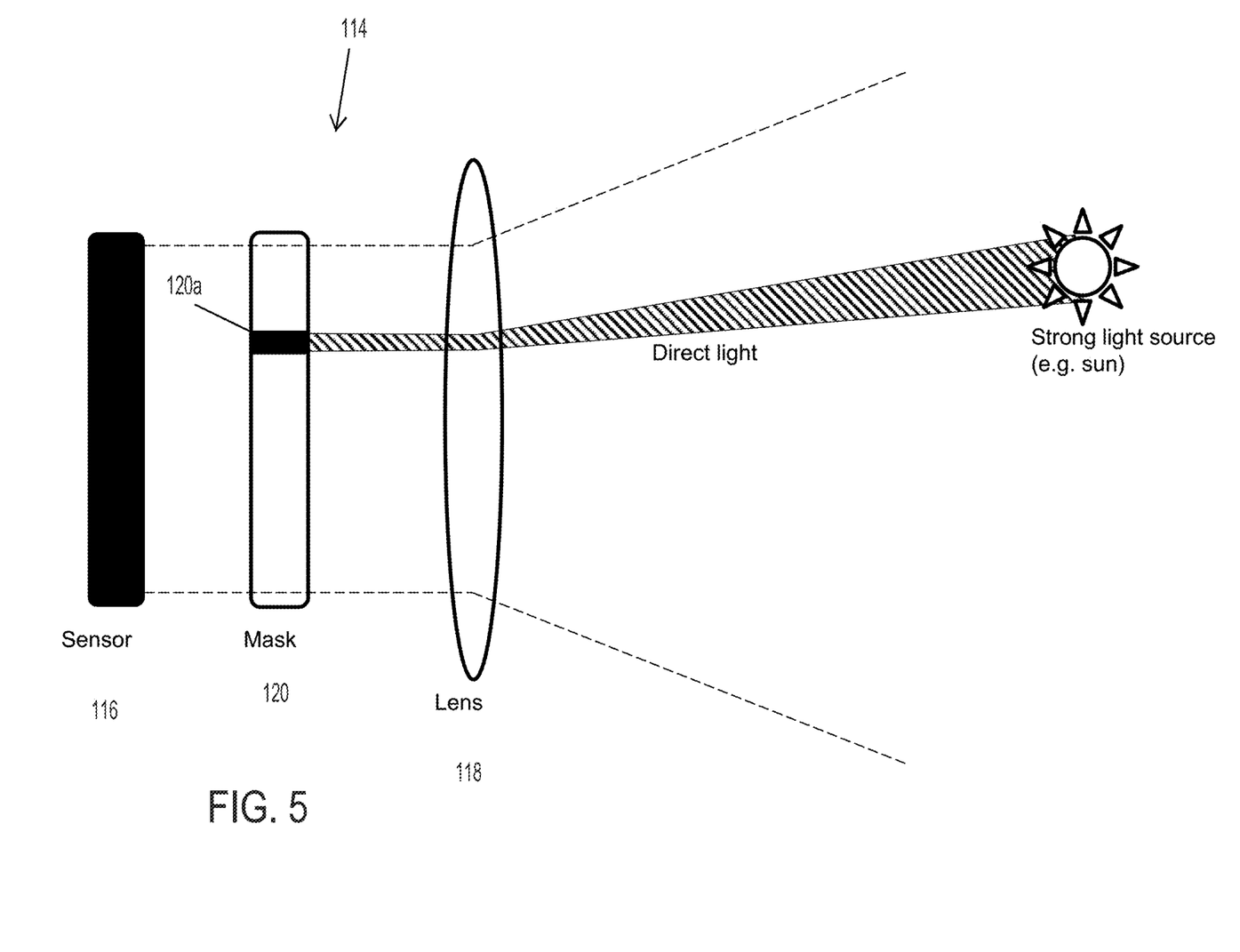
FIG. 5 is a schematic showing the forward viewing camera with the adaptive mask disposed between the imager or sensor and the lens for attenuating light from the bright light source in the field of view of the camera.

Referring now to FIG. 5, a vehicular camera 114 has an adaptive masking element 120 is disposed between the imager 116 and the lens 118. When a strong or intense light source (e.g., the sun when rising or setting ahead of the vehicle and/or in the field of view of the sensor) is present in the field of view or sensing of the sensor, the system (via processing by a processor at the ECU or control of image data captured by the sensor or camera) determines the location where the direct light is present along the optical path from the lens to the imager and generates a mask or light attenuator 120a at that location on the adaptive masking element. The generated mask blocks or attenuates the bright light incident at that area of the masking element so that the bright light is not imaged or captured by the imager.

The adaptive masking element and system mask or attenuate the light responsive to or based at least in part on the intensity or brightness of the determined light source or light sources. For example, the system may mask light sources that have a determined brightness greater than a threshold level, such as greater than 1,000 lux during nighttime driving on a dark unlit country road, or such as greater than 150,000 lux during daytime driving on a sunny day. An image sensor provides a brightness score for each pixel, which, when the scores are combined, results in the full image being transmitted to the image processor. If, for example, the value of each pixel can be between 0 and 1023 (10 Bit image), then the threshold could be 1023 which means that at this level the pixel is saturated. This can be a good measure for the related strong light sources. The system may also mask multiple light sources if it is determined that multiple light sources in the field of view of the imager have a brightness or intensity greater than the threshold level.

The system may determine an ambient light level at the vehicle (such as via processing image data captured by the camera or such as via a separate ambient light sensor or the like), and may adjust the threshold level at which the system masks a light source responsive to the determined ambient light level. Thus, for example, when the ambient light level is higher (such as on a sunny day), the system may increase the threshold level at which the system masks a light source and, when the ambient light level is lower (such as at night), the system may decrease the threshold level at which the system masks a light source. The system may also adjust the degree of masking (i.e., the degree of transmissivity of visible light through the masking element) responsive to the intensity of the detected intense light source compared to the ambient light level.

Figure 6:
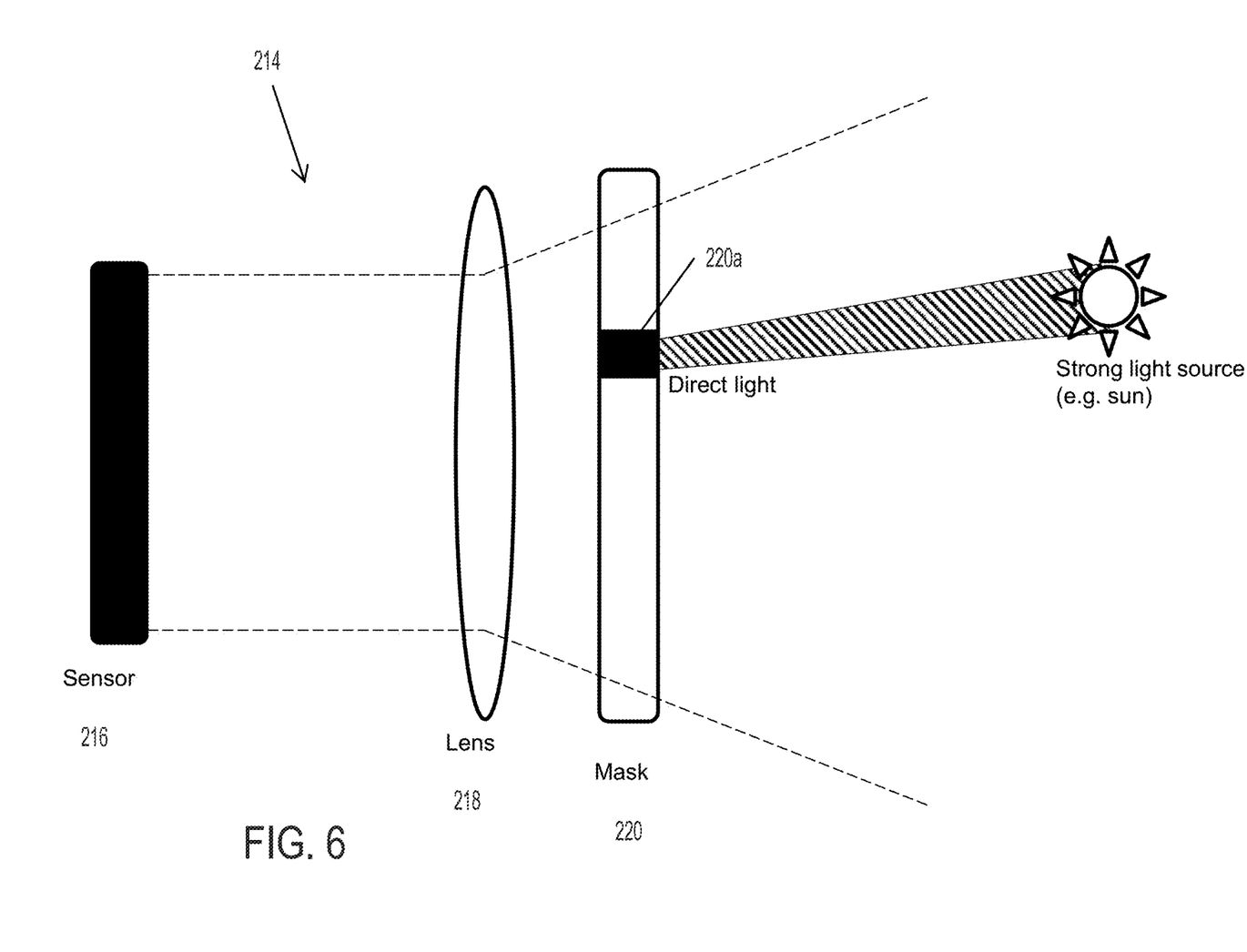
FIG. 6 is a schematic showing the forward viewing camera with the adaptive mask disposed in front of the lens for attenuating light from the bright light source in the field of view of the camera.

Optionally, and such as shown in FIG. 6, a vehicular camera 214 has an adaptive masking element 220 is disposed in front of the lens 218 and imager 216. When a strong or intense light source (e.g., the sun when rising or setting ahead of the vehicle and/or in the field of view of the sensor) is present in the field of view or sensing of the sensor, the system (via processing by a processor at the ECU or control of image data captured by the sensor or camera) determines the location where the direct light is present along the optical path from the bright light source to the lens and to the imager, and generates a mask or light attenuator 220a at that location on the adaptive masking element. The generated mask blocks or attenuates the bright light incident at that area of the masking element so that the bright light is not imaged or captured by the imager.

Figure 7:
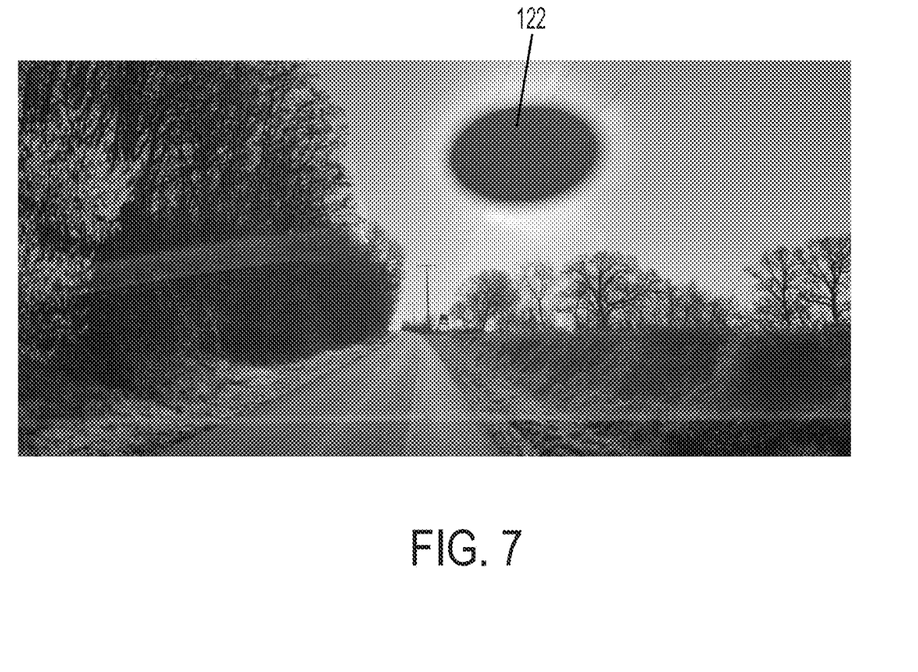
FIGS. 7 and 8 are images captured by the forward viewing camera of the vehicle with adaptive masking in the field of view of the camera in accordance with the present invention.
Figure 8:
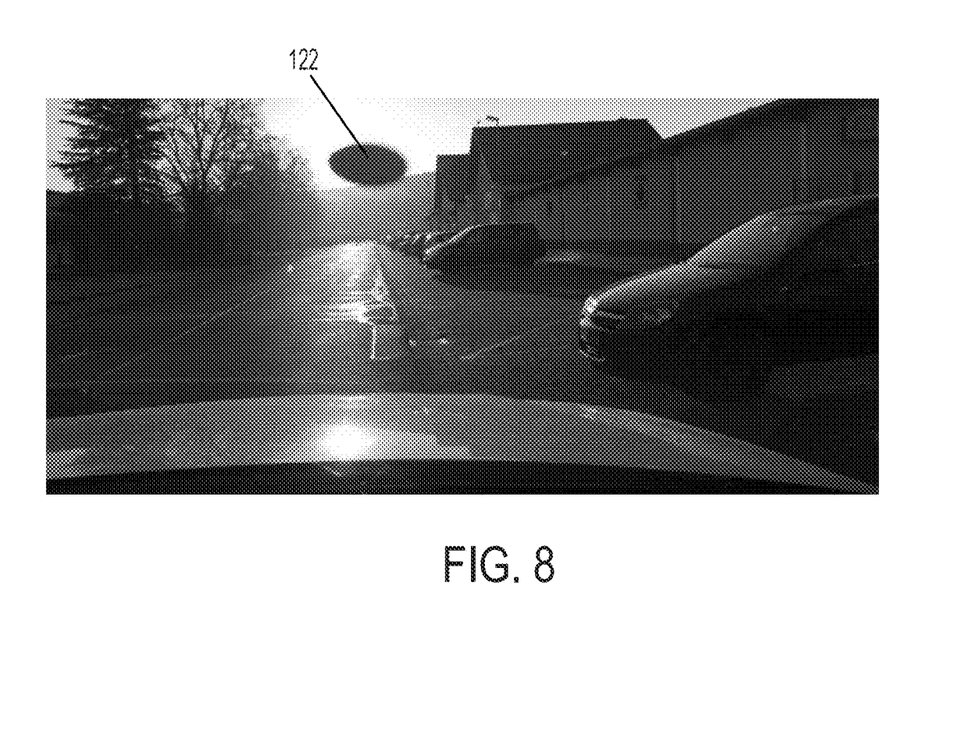

As shown in FIGS. 7 and 8, the presence of the mask 120a (or 220a) at the masking element blocks the bright light (see the masked or light attenuated regions 122 in FIGS. 7 and 8) from being imaged by the imager. The adaptive masking provides a mask at the area where the peak of the incoming light rays appear. As discussed above, the mask can be placed between the imager and the lens, or in front of lens. As can be seen by comparing FIGS. 7 and 8 with FIGS. 3 and 4, the mask reduces overall reflections and glare level, enabling higher detail visibility and contrast in important areas, such as at the road surface in front of the vehicle.

The shape, position and dimensions of the mask are determined or calculated depending on the relative position of the mask element (relative to the lens and the imager) and the intrinsic characteristics of the optical device. The intensity of the masking level can be either binary or adaptive, to allow some incoming light in the specific area to be imaged by the imager. For example, the mask may be partially light transmitting to allow some amount of the light emanating from the bright light source to pass through the masking element to the imager.

The masking element may comprise any suitable element, such as a liquid crystal element (such as of the type typically used in liquid crystal displays or the like). For example, the masking element may utilize aspects of the systems and devices described in U.S. Publication No. US-2011-0273659, which is hereby incorporated herein by reference in its entirety. Alternatively, other electro-optic technologies may be used, such as, for example, electrochromic technology or aligned particle technology (where particles in the element, when aligned in one direction, allow light to pass through the element and, when aligned in another direction, attenuate or limit or preclude transmission of light therethrough) or the like, such as by utilizing aspects of the systems described in U.S. Pat. Nos. 10,227,046; 7,855,755 and/or 6,995,891, and/or N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated herein by reference in their entireties.

Therefore, the system and camera of the present invention provides enhanced imaging of an exterior scene when a bright light source is present in the field of view of the camera. The selective or adaptive masking of the field of view of the camera (or field of sensing of any suitable optical sensing device) enables netter scene specific exposure control, not considering the bright light spot. The selective or adaptive masking also reduces thermal absorption at the sensor, which further leads to improved image noise levels in the captured image data (or captured sensor data). The selective or adaptive masking also reduces internal reflections caused by the strong incoming light intensity. The system thus provides enhanced imaging of the scene viewed by the camera (such as a forward viewing camera) to provide enhanced object detection or pedestrian detection or lane marker detection or the like, such as for driving assist systems and/or autonomous vehicle control systems or the like.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photo-sensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in U.S. Pat. Nos. 10,071,687; 9,900,522; 9,834,153; 9,762,880; 9,596,387; 9,126,525 and/or 9,041,806, and/or U.S. Publication Nos. US-2015-0022664 and/or US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, said vehicular vision system comprising:
    a camera disposed at a vehicle equipped with said vehicular vision system and having a field of view exterior of the vehicle, wherein the camera comprises an imager having a plurality of rows and columns of photosensing elements and a lens that focuses light at the imager, the imager sensing light incident thereat;
    wherein the camera captures image data;
    an adaptive masking element disposed in an optical path of the camera;
    a control comprising electronic circuitry and associated software, wherein the electronic circuitry comprises an image processor for processing image data captured by the camera;
    wherein the control, responsive to processing of image data captured by the camera, determines presence of a light source in the field of view of the camera;
    wherein the control, responsive to determination of presence of the light source in the field of view of the camera, determines a location where light emanating from that light source impinges the adaptive masking element;
    wherein the adaptive masking element, responsive to determination of the location where light emanating from that light source impinges the adaptive masking element, generates a light attenuating mask at that location to attenuate the light emanating from that light source so that the imager does not fully sense the light emanating from that light source;
    wherein the adaptive masking element generates the light attenuating mask responsive to determination that the light source has a brightness greater than a threshold level of brightness;
    wherein the threshold level of brightness is adjusted responsive to a determined ambient light level; and
    wherein the adaptive masking element adjusts a degree of light attenuation of the light attenuating mask responsive to comparison of the brightness of the light source to the determined ambient light level.

2. The vehicular vision system of claim 1, wherein the light attenuating mask, when generated responsive to determination that the brightness of the light source is above a maximum threshold level, comprises a non-light-transmitting mask to block the light emanating from that light source.

3. The vehicular vision system of claim 1, wherein the light attenuating mask, when generated, comprises a partially-light-transmitting mask to attenuate the light emanating from that light source.

4. The vehicular vision system of claim 1, wherein the adaptive masking element is disposed between the lens and the imager so that the light attenuating mask, when generated, attenuates the light after the light passes through the lens.

5. The vehicular vision system of claim 1, wherein the adaptive masking element is disposed in front of the lens so that the light attenuating mask attenuates, when generated, the light before the light is incident at the lens.

6. The vehicular vision system of claim 1, wherein the lens comprises a plurality of optical elements accommodated in a lens barrel, and wherein the optical path is along a longitudinal axis of the lens barrel.

7. The vehicular vision system of claim 1, wherein the adaptive masking element comprises a liquid crystal element.

8. The vehicular vision system of claim 1, wherein the adaptive masking element adjusts alignment of particles within the adaptive masking element to adjust a degree of transmissivity of visible light the adaptive masking element.

9. The vehicular vision system of claim 1, wherein the camera is disposed at a windshield of the vehicle and views through the windshield and forward of the vehicle.

10. A vehicular vision system, said vehicular vision system comprising:
    a camera disposed at a windshield of a vehicle equipped with said vehicular vision system and having a field of view through the windshield and forward of the vehicle, wherein the camera comprises an imager having a plurality of rows and columns of photosensing elements and a lens that focuses light at the imager, the imager sensing light incident thereat;
    wherein the camera captures image data;
    an adaptive masking element disposed in an optical path of the camera;
    a control comprising electronic circuitry and associated software, wherein the electronic circuitry comprises an image processor for processing image data captured by the camera;
    wherein the control determines an ambient light level at the vehicle and a threshold level of brightness is established based at least in part on the determined ambient light level;
    wherein the control, responsive to processing of image data captured by the camera, determines presence of a light source in the field of view of the camera having a brightness greater than the threshold level of brightness;

wherein the control, responsive to determination of presence of the light source in the field of view of the camera, determines a location where light emanating from that light source impinges the adaptive masking element;

wherein the adaptive masking element, responsive to determination of the location where light emanating from that light source impinges the adaptive masking element, generates a light attenuating mask at that location to attenuate the light emanating from that light source so that the imager does not fully sense the light emanating from that light source;

wherein the adaptive masking element generates the light attenuating mask responsive to determination that the light source has a brightness greater than a threshold level of brightness;

wherein the threshold level of brightness is adjusted responsive to a determined ambient light level; and wherein the adaptive masking element adjusts a degree of light attenuation of the light attenuating mask responsive to comparison of the brightness of the light source to the determined ambient light level.

11. The vehicular vision system of claim 10, wherein the light attenuating mask, when generated responsive to determination that the brightness of the light source is above a maximum threshold level, comprises a non-light-transmitting mask to block the light emanating from that light source.

12. The vehicular vision system of claim 10, wherein the light attenuating mask, when generated, comprises a partially-light-transmitting mask to attenuate the light emanating from that light source.

13. The vehicular vision system of claim 10, wherein the adaptive masking element is disposed between the lens and the imager so that the light attenuating mask, when generated, attenuates the light after the light passes through the lens.

14. The vehicular vision system of claim 10, wherein the adaptive masking element is disposed in front of the lens so that the light attenuating mask attenuates, when generated, the light before the light is incident at the lens.

15. The vehicular vision system of claim 10, wherein the adaptive masking element comprises a liquid crystal element.

16. A vehicular vision system, said vehicular vision system comprising:

a camera disposed at a windshield of a vehicle equipped with said vehicular vision system and having a field of view through the windshield and forward of the vehicle, wherein the camera comprises an imager having a plurality of rows and columns of photosensing elements and a lens that focuses light at the imager, the imager sensing light incident thereat;

wherein the camera captures image data;

an adaptive masking element disposed in an optical path of the camera;

wherein the adaptive masking element is operable to adjust alignment of particles within the adaptive masking element to adjust a degree of transmissivity of visible light through the adaptive masking element;

a control comprising electronic circuitry and associated software, wherein the electronic circuitry comprises an image processor for processing image data captured by the camera;

wherein the control, responsive to processing of image data captured by the camera, determines presence of a light source in the field of view of the camera;

wherein the control, responsive to determination of presence of the light source in the field of view of the camera, determines a location where light emanating from that light source impinges the adaptive masking element;

wherein the adaptive masking element, responsive to determination of the location where light emanating from that light source impinges the adaptive masking element, generates a light attenuating mask at that location to attenuate the light emanating from that light source so that the imager does not fully sense the light emanating from that light source;

wherein the adaptive masking element generates the light attenuating mask responsive to determination that the light source has a brightness greater than a threshold level of brightness;

wherein the threshold level of brightness is adjusted responsive to a determined ambient light level; and wherein the adaptive masking element adjusts a degree of light attenuation of the light attenuating mask responsive to comparison of the brightness of the light source to the determined ambient light level.

17. The vehicular vision system of claim 16, wherein the adaptive masking element is disposed between the lens and the imager so that the light attenuating mask, when generated, attenuates the light after the light passes through the lens.

18. The vehicular vision system of claim 16, wherein the adaptive masking element is disposed in front of the lens so that the light attenuating mask attenuates, when generated, the light before the light is incident at the lens.

* * * * *